(12) United States Patent
Taniguchi et al.

(10) Patent No.: US 9,751,016 B2
(45) Date of Patent: Sep. 5, 2017

(54) MANAGEMENT APPARATUS, CONTROL METHOD THEREFOR, AND COMPUTER-READABLE RECORDING MEDIUM

(71) Applicant: KONAMI DIGITAL ENTERTAINMENT CO., LTD., Minato-ku, Tokyo (JP)

(72) Inventors: Takashi Taniguchi, Tokyo (JP); Yuji Osato, Tokyo (JP); Takaaki Kotera, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 429 days.

(21) Appl. No.: 14/521,594

(22) Filed: Oct. 23, 2014

(65) Prior Publication Data
US 2015/0046576 A1 Feb. 12, 2015

Related U.S. Application Data

(63) Continuation of application No. PCT/JP2013/062171, filed on Apr. 25, 2013.

(30) Foreign Application Priority Data

Apr. 27, 2012 (JP) ................................. 2012-102300

(51) Int. Cl.
G06F 15/16 (2006.01)
A63F 13/77 (2014.01)
(Continued)

(52) U.S. Cl.
CPC .............. *A63F 13/77* (2014.09); *A63F 13/35* (2014.09); *A63F 13/352* (2014.09); *A63F 13/71* (2014.09);
(Continued)

(58) Field of Classification Search
CPC .................. H04L 12/588; H04L 51/32; H04L 61/10–61/3015
See application file for complete search history.

(56) References Cited

U.S. PATENT DOCUMENTS

2004/0192339 A1 9/2004 Wilson et al.
2006/0190551 A1 8/2006 Kato et al.
(Continued)

FOREIGN PATENT DOCUMENTS

CN 100450266 C 1/2009
JP 2005-322070 A 11/2005
(Continued)

OTHER PUBLICATIONS

International Search Report for PCT/JP2013/062171 dated Jun. 4, 2013.
(Continued)

*Primary Examiner* — Brendan Higa
(74) *Attorney, Agent, or Firm* — Sughrue Mion, PLLC

(57) ABSTRACT

A management server issues a token associated with friend network identification information identifying a user of a game provided by an application server, to the application server; receives the token passed from the game to another game on the basis of an operation of the user in a terminal apparatus where the game and the other game are available, from an application server that provides the other game; and manages, in association with each other, the friend network identification information related to the game and friend network identification information related to the other game for which the issued token matches the received token.

8 Claims, 10 Drawing Sheets

(51) Int. Cl.
  *A63F 13/35*    (2014.01)
  *H04L 29/12*    (2006.01)
  *H04L 12/24*    (2006.01)
  *A63F 13/795*   (2014.01)
  *A63F 13/73*    (2014.01)
  *A63F 13/352*   (2014.01)
  *A63F 13/71*    (2014.01)
  *A63F 13/87*    (2014.01)

(52) U.S. Cl.
  CPC ............ *A63F 13/73* (2014.09); *A63F 13/795* (2014.09); *H04L 41/024* (2013.01); *H04L 41/0293* (2013.01); *H04L 61/30* (2013.01); *H04L 61/301* (2013.01); *A63F 13/87* (2014.09)

(56) References Cited

U.S. PATENT DOCUMENTS

| | | | |
|---|---|---|---|
| 2008/0114868 A1* | 5/2008 | Thayer | H04L 29/12594 709/223 |
| 2010/0211994 A1 | 8/2010 | Yamaguchi | |
| 2012/0088579 A1 | 4/2012 | Youm | |
| 2012/0233265 A1* | 9/2012 | Joy | G06Q 50/01 709/206 |
| 2013/0057586 A1 | 3/2013 | Tsuda et al. | |
| 2014/0025780 A1* | 1/2014 | An | H04L 63/08 709/217 |
| 2014/0106878 A1* | 4/2014 | Knutsson | A63F 13/12 463/31 |

FOREIGN PATENT DOCUMENTS

| | | |
|---|---|---|
| JP | 2006195791 A | 7/2006 |
| JP | 2006-260547 A | 9/2006 |
| JP | 2007-206823 A | 8/2007 |
| JP | 2011-101775 A | 5/2011 |
| JP | 2011-242857 A | 12/2011 |
| WO | 2009/051146 A1 | 4/2009 |

OTHER PUBLICATIONS

International Search Report for PCT/JP2013/062172 dated Jun. 4, 2013.

Communication dated Apr. 5, 2017 from the State Intellectual Property Office of the P.R.C. in counterpart Application No. 201380022067.9.

Communication dated Mar. 2, 2017 from U.S. Patent & Trademark Office in copending U.S. Appl. No. 14/521,607.

* cited by examiner

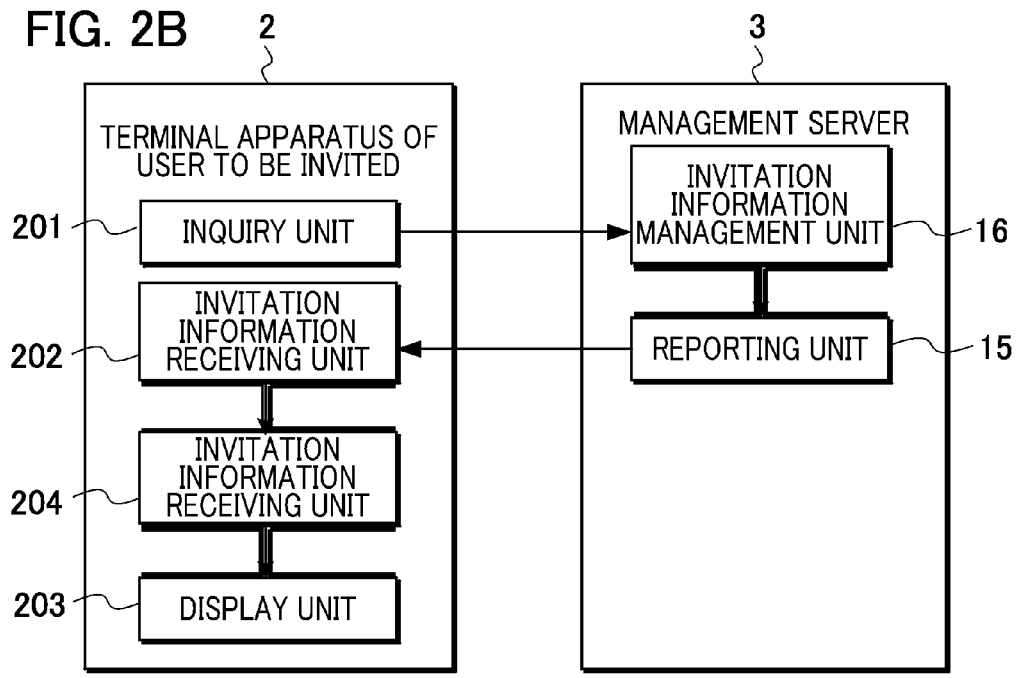
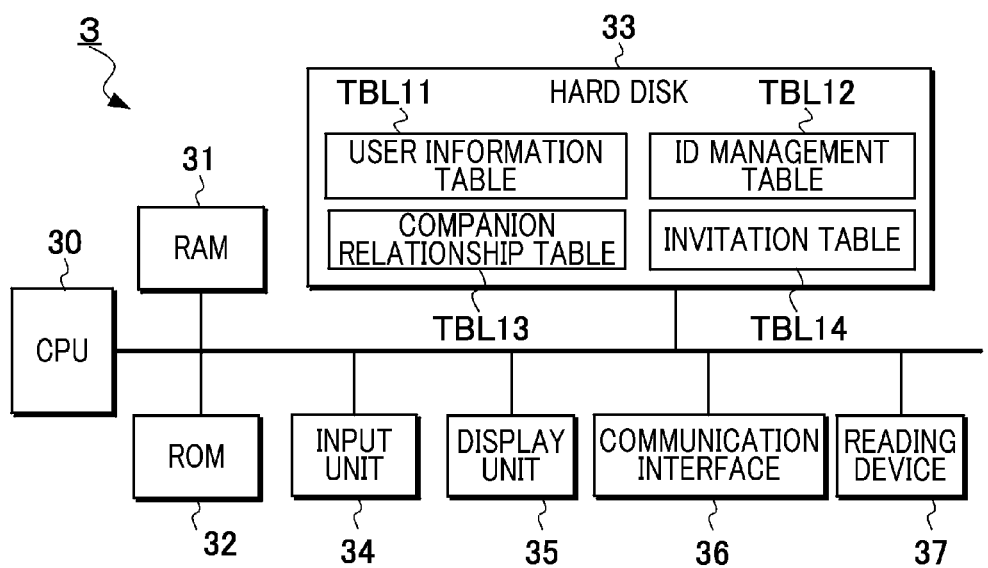

FIG. 4

TBL11

| ID | AppID | NICKNAME | FNWID | TOKEN | TOKEN ISSUING DATE |
|---|---|---|---|---|---|
| 1 | 00000001 | YUNISHIO | XCV56714 | 56844SAS | 2012/3/28 22:00 |
| 2 | 00000002 | MARICCHO | YUJ85224 | — | — |
| 3 | 00000003 | TAROBEH | 23150QWE | 12118LKJ | 2012/4/1 14:00 |
| 4 | 00000002 | YASUPPE | REK35460 | — | — |
| 5 | 00000001 | TETSUJI | QWE75891 | — | — |
| ⋮ | ⋮ | ⋮ | ⋮ | ⋮ | ⋮ |

FIG. 5

TBL12

| ID | RefID | FNWID |
|---|---|---|
| 1 | 00000011 | XCV56714 |
| 2 | 00000011 | REK35460 |
| 3 | 00000123 | 23150QWE |
| 4 | 00000123 | QWE75891 |
| ⋮ | ⋮ | ⋮ |

FIG. 6

TBL13

| ID | Group | AppID | LocalID_From | LocalID_To | FNWID_From | FNWID_To | Stat |
|----|-------|-------|--------------|------------|------------|----------|------|
| 1 | Freinds | 00000001 | 00000011 | 00003120 | XCV56714 | QWE75891 | 1 |
| 2 | Freinds | 00000002 | 00000123 | 00000011 | REK354602 | 23150QWE | 0 |
| 3 | Rival | 00000001 | 00003120 | 00000011 | QWE75891 | XCV56714 | null |
| 4 | Block | 00000002 | 00000123 | 00003120 | REK354602 | SCF55663 | null |
| 5 | Freinds | 00000001 | 00000011 | 00002221 | XCV56714 | KLY5711 | 2 |
| ... | ... | ... | ... | ... | ... | ... | ... |

TBL14

| ID | InviteAppID | InviteFNWID_From | InviteFNWID_To | NICKNAME |
|---|---|---|---|---|
| 1 | 00000001 | XCV56714 | 23150QWE | YASUPPE |
| ⋮ | ⋮ | ⋮ | ⋮ | ⋮ |

MANAGEMENT APPARATUS, CONTROL METHOD THEREFOR, AND COMPUTER-READABLE RECORDING MEDIUM

CROSS REFERENCE TO RELATED APPLICATIONS

This application is a Continuation Application of PCT Application No. PCT/JP2013/062171, filed Apr. 25, 2013, and is based on and claims the benefit of priority from prior Japanese Patent Application No. 2012-102300, filed Apr. 27, 2012, the entire contents of both of which are incorporated herein by reference.

TECHNICAL FIELD

The present invention relates to a technology for associating identification information that manages a plurality of separately provided applications.

BACKGROUND ART

In recent years, services that provide applications on the Internet have rapidly become widespread. As one example of this type of service, the SNS (Social Network Service) provide applications such as games for members, who are site users. The SNS manages membership information that identifies the members. The same user has different user information (hereafter called an account) in different applications. The SNS associate these accounts with the membership information so as to be able to provide connected services related to a plurality of applications. In the connected services, users who know each other can recognize which applications they use. (See Patent Document 1, for example.)

CITATION LIST

Patent Document

Patent Document 1: Unexamined Japanese Patent Application Publication No. 2007-206823

SUMMARY OF THE INVENTION

Technical Problem

There are applications that do not rely on the SNS and that can be used by persons who are not members of the SNS (hereafter called general applications). Even in such general applications, since the accounts are incompatible, connected services related to the general applications cannot be provided to the users. On the other hand, each user can use a plurality of general applications with one terminal apparatus. To collectively manage the user accounts of these plurality of general applications, a management server that combines the accounts is required, as in SNS platform systems.

To introduce such a management server, however, it is necessary to set up a new administrative account for each user in the management server and also to associate the respective accounts used in the plurality of general application servers, with one another. Therefore, each user needs to manage the new administrative account in addition to the existing accounts.

In consideration of the above situations, an object of the present invention is to provide a management apparatus that can associate a plurality of accounts provided by a plurality of general applications that do not rely on the SNS, without having to set up a new administrative account managed by each user.

Solution to Problem

Means employed by the present invention to achieve the above-described object will be described below.

To achieve the foregoing object, the present invention provides a management apparatus that has a communication unit for communicating with a plurality of application apparatuses including a first application apparatus providing a first application and a second application apparatus providing a second application, and that issues and manages first identification information uniquely identifying each of a plurality of users who use the first application and second identification information uniquely identifying each of a plurality of users who use the second application. The management apparatus includes an issuing unit configured to issue an identifier associated with the first identification information of a user, with regard to the first application apparatus; a receiving unit configured to receive the identifier passed from the first application to the second application in a terminal apparatus where the first application and the second application are available; and a management unit configured to manage, in association with each other, the first identification information and the second identification information for which the identifier issued by the issuing unit matches the identifier received by the receiving unit.

Next, the present invention provides a control method for a management apparatus that has a communication unit for communicating with a plurality of application apparatuses including a first application apparatus providing a first application and a second application apparatus providing a second application, and that issues and manages first identification information uniquely identifying each of a plurality of users who use the first application and second identification information uniquely identifying each of a plurality of users who use the second application. The control method includes issuing an identifier associated with the first identification information of a user, to the first application apparatus; receiving, from the second application apparatus, the identifier passed from the first application to the second application; and managing, in association with each other, the first identification information and the second identification information for which the issued identifier matches the received identifier.

Next, the present invention provides a computer-readable recording medium having recorded thereon a program used in a computer of a management apparatus that has a communication unit for communicating with a plurality of application apparatuses including a first application apparatus providing a first application and a second application apparatus providing a second application, and that issues and manages first identification information uniquely identifying each of a plurality of users who use the first application and second identification information uniquely identifying each of a plurality of users who use the second application. The program makes the computer of the management apparatus execute an issuing process of issuing an identifier associated with the first identification information of a user, to the first application apparatus; a receiving process of receiving, from the second application apparatus, the identifier passed from the first application to the second application; and a management process of managing, in association with each other, the first identification information and the second identification information for which the identifier issued in the issuing process matches the identifier received in the receiving process.

BRIEF DESCRIPTION OF THE DRAWINGS

FIG. 2B is a view showing an outline of processing for inquiring about an invitation request.
FIG. 3 is a block diagram showing a structure of a management server.
FIG. 4 is a view showing an example data structure of a user information table.
FIG. 5 is a view showing an example data structure of an ID management table.
FIG. 6 is a view showing an example data structure of a companion relationship table.

DESCRIPTION OF EMBODIMENTS

Figure 1:
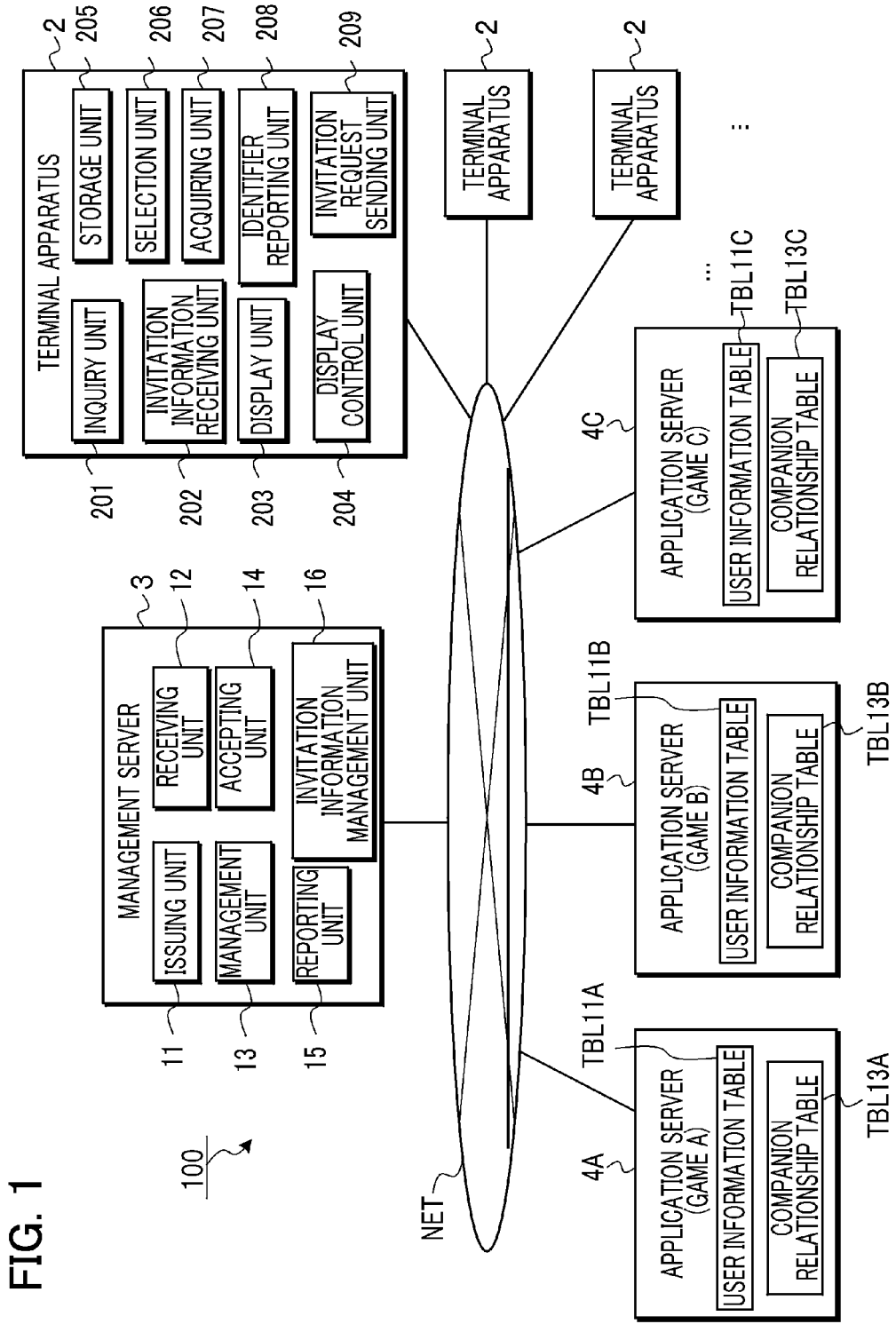
FIG. 1 is a block diagram of an application system according to an embodiment of the present invention.

An application system using a management server according to an embodiment of the present invention will be described below with reference to the drawings.
1. Structure of Application System
FIG. 1 is a block diagram of an application system 100 according to an embodiment of the present invention. The application system 100 includes a communication network NET such as the Internet, user terminal apparatuses 2, a management server 3, and application servers 4A, 4B, 4C, . . . . The application servers 4A, 4B, 4C, . . . manage user accounts individually and provide the users with individual services by using respective applications. In this example, the application servers 4A, 4B, 4C, . . . provide game A, game B, game C, . . . , respectively as individual services. Game A, game B, game C, . . . can be browser games provided by browsers, but, in this example, it is assumed that the programs of game A, game B, game C, . . . are downloaded into user terminal apparatuses 2, are installed in the terminal apparatuses 2, and are executed thereon. In this case, the application servers 4A, 4B, 4C, . . . manage game data of users of game A, game B, game C, . . . and provide the users with score rankings and other data.

The application servers 4A, 4B, 4C, . . . provide various types of applications (for sharing photos and video, for example) such as game A, game B, game C, . . . and may have a function for exchanging communications among users in addition to the individual services provided by the applications. Users of each application can use such a communication function to acquire points that can be exchanged in the game by establishing companion relationships with users who play the same game (application) to communicate with one another by greetings and comments. The more companions you have, the more easily you proceed in a game because you can obtain support from your companions in a battle in the game. A companion relationship is made, for example, when a user makes a companion offer and the offer-destination user approves it.

The management server 3 can communicate with the application servers 4A, 4B, 4C, . . . . The user terminal apparatuses 2 can perform communication through the communication network NET, and are, for example, personal computers or portable telephones.

To provide users with connected services related to a plurality of games that do not rely on the SNS, it is necessary to associate accounts used in the games with one another. When the accounts are associated with one another, it becomes possible for a user who is playing a game to invite, to that game, another user who is a companion of the user in another game, as example connected services. Specifically, when a user of game A uses game B, the user can invite a user with whom the user has a companion relationship in game B, to game A.

In such games that do not rely on the SNS, when a user invites another user to a game being used by the user, a social medium or an email has been used conventionally. However, it is not clear whether a user to be invited uses a social medium. The email address may be unknown. A user with whom a companion relationship has been made in a game does not necessarily have a friendship relationship in actual society. It is difficult to identify, in a social medium, the user to be invited because the user name (nickname) known in the game does not match the user name (account) used in email or the social medium used in actual society. Therefore, a user with whom a companion relationship has been made in a game cannot be invited in some cases by using the social medium or email. When accounts used in a plurality of games that do not rely on the SNS are associated, it becomes possible for a user who is playing a game to invite to that game another user who is a companion of the user in another game.

To make an invitation, it is necessary first to associate the account in game A (example of application A) and the account in game B (example of application B) of a user who makes the invitation (inviting user). Second, it is necessary to identify a user who has a companion relationship in game B with the inviting user. Since this processing needs to be performed over the different applications, neither the application server 4A nor the application server 4B can execute the processing alone.

Figure 2A:
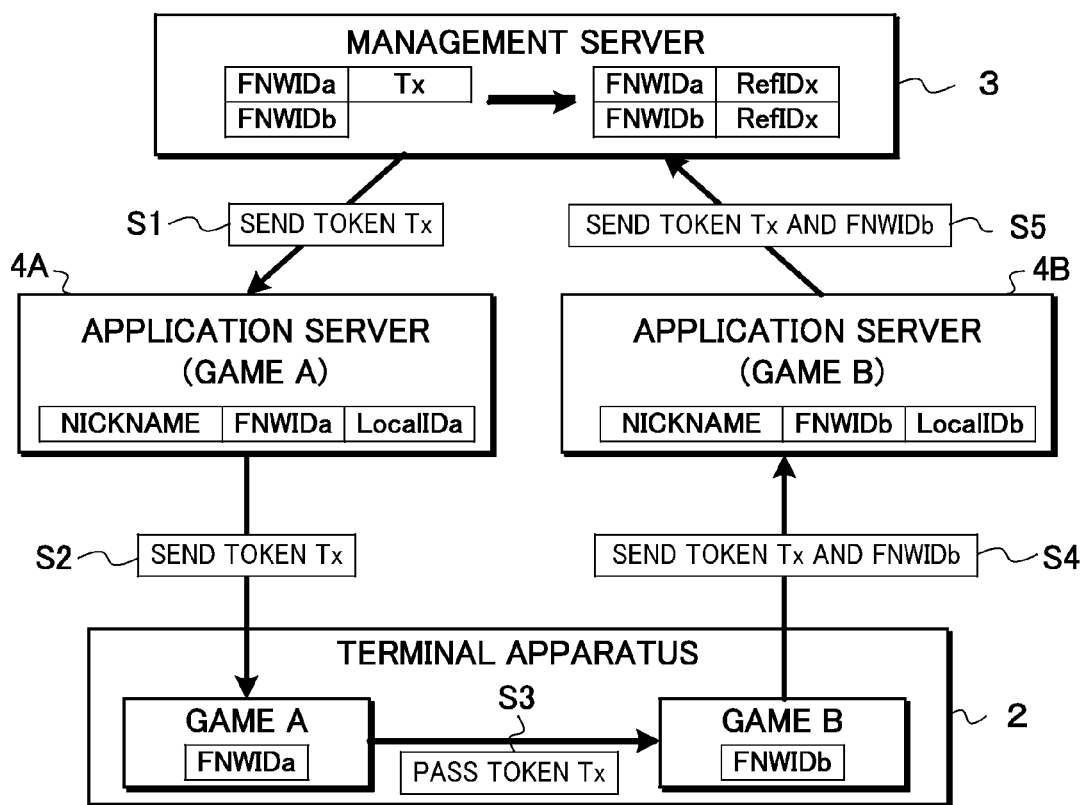
FIG. 2A is a view showing an outline of processing for associating accounts.

The management server 3 executes associating processing for associating the account in game A and the account in game B of the inviting user, and inviting processing for providing the inviting user with a candidate for a user who receives the invitation (a user to be invited).
1.1 Outline of Associating Processing
An outline of the associating processing will be described with reference to FIG. 2A. When a user registers an account, the application servers 4A and 4B generate local identification information (hereafter called LocalID). This LocalID is identification information uniquely identifying each user in each of the application servers 4A and 4B. Therefore, the same user has different LocalIDs, which are incompatible.

At a desired timing after the LocalIDs are generated, the application servers 4A and 4B request the management server 3 to issue friend network identification information (hereafter called FNWID). The FNWIDs are identification information for identifying the users in the entire application system 100 and are managed collectively by the management server 3. The management server 3 issues FNWIDs in response to FNWID issue requests sent from the application servers 4A and 4B. Therefore, different FNWIDs are issued even if the user of game A and the user of game B are the same user.

The application server 4A manages, in association with each other, the FNWID (example of first identification information) and the LocalID that uniquely identifies each of a plurality of users who use game A, and the application server 4B manages, in association with each other, the FNWID (example of second identification information) and the LocalID that uniquely identifies each of a plurality of users who use game B.

In this example, it is assumed that the FNWID issued in response to the FNWID issue request sent from the application server 4A for a user who plays game A is called FNWIDa, the LocalID corresponding to FNWIDa is called LocalIDa, the FNWID issued in response to the FNWID issue request sent from the application server 4B, corresponding to game B, for the same user who plays game A is called FNWIDb, the LocalID corresponding to FNWIDb is called LocalIDb, type information corresponding to game A is called AppIDa, and type information corresponding to game B is called AppIDb. FNWIDa is stored in the management server 3, the application server 4A, and the terminal apparatus 2. In the same manner, FNWIDb is stored in the management server 3, the application server 4B, and the terminal apparatus 2. LocalIDa is stored in the application server 4A, and LocalIDb is stored in the application server 4B. When FNWIDa and FNWIDb are issued, the management server 3 cannot yet recognize that they are identification information issued to the same user.

In the associating processing for associating FNWIDa with FNWIDb, the management server 3 issues a token Tx (identifier) corresponding to FNWIDa and sends the token Tx to the application server 4A (S1). The application server 4A sends the received token Tx to game A of the terminal apparatus 2 corresponding to FNWIDa (S2). The timing at which the management server 3 sends the token Tx to the application server 4A (S1) and the timing at which the application server 4A sends the token Tx to the terminal apparatus 2 (S2) need not be linked. For example, the application server 4A may send the token Tx to the terminal apparatus 2 in response to a request made by the terminal apparatus 2.

Then, in the terminal apparatus 2, the token Tx is passed from game A corresponding to FNWIDa to game B corresponding to FNWIDb (S3). The passed token Tx and FNWIDb are sent from game B to the application server 4B (S4). The application server 4B sends the token Tx and FNWIDb to the management server 3 (S5). In the process for passing the token Tx from game A to game B (S3), a predetermined area (application share area) in a storage device 23 (see FIG. 8) of the terminal apparatus 2 may be involved.

In this manner, the token Tx issued by the management server 3 in association with FNWIDa is transferred from the application server 4A to the management server 3 through game A in the terminal apparatus 2, game B in the terminal apparatus 2, and the application server 4B, and is received in association with FNWIDb. The management server 3 searches tokens already issued. When the received token matches an issued token, the management server 3 associates FNWID corresponding to the received token with FNWID corresponding to the issued token. In this example, the received token is Tx, and the FNWID corresponding thereto is FNWIDb. In the management server 3, the token Tx that matches the received token Tx is associated with FNWIDa. Therefore, the management server 3 can associate FNWIDa with FNWIDb. For example, reference identification information (hereafter called RefID) common to FNWIDa and FNWIDb is issued. When an RefID common to FNWIDa and FNWIDb is called RefIDx here, FNWIDa and FNWIDb are stored in association with RefIDx, as shown in FIG. 2A, to associate FNWIDa with FNWIDb.

With respect to the above-described associating processing, the management server 3 shown in FIG. 1 can communicate with a plurality of application servers that include the application server 4A (example of first application apparatus) that provides game A (example of first application) and the application server 4B (example of second application apparatus) that provides game B (example of second application), and issues FNWIDa (first identification information) uniquely identifying each of a plurality of users who use game A and FNWIDb (second identification information) uniquely identifying each of a plurality of users who use game B and manages them.

The management server 3 also includes an issuing unit 11 for issuing a token (example identifier) associated with FNWIDa of a user to the application server 4A, a receiving unit 12 for receiving the token passed from game A to game B in a terminal apparatus 2 in which game A and game B are available, from the application server 4B, and a management unit 13 for managing, in association with each other, FNWIDa and FNWIDb for which the token issued by the issuing unit 11 and the token received by the receiving unit 12 match. When the management server 3 executes the inviting processing, the user here is an inviting user who makes an invitation to game A.

Here, a game is an example application. The receiving unit 12 receives the token passed from game A to game B, but the route of the token can be freely selected. For example, the token may be directly received from the terminal apparatus 2, or the token may be indirectly received through the application server 4B (second application apparatus). The trigger for passing the token from game A to game B may be based on an operation of the user, an automatic process in game A, or on a program process executed in the terminal apparatus, activated by game A. So long as it can be checked whether the token issued by the issuing unit and the token received by the receiving unit match, any generation method can be used, and the token can have any contents. For example, the token may be a unique character string in which alphanumeric characters are combined.

On the other hand, the terminal apparatus 2 includes a storage unit 205 for storing an FNWID (example identification information) for each available game (an example application). The terminal apparatus 2 further includes an acquiring unit 207 for acquiring the token that corresponds to FNWIDa in game A being used and that was issued by the management server 3. The terminal apparatus 2 also includes an identifier reporting unit 208 for reporting to the management server 3, through a predetermined path, a pair of the token acquired by the acquiring unit 207 and FNWIDb in game B. For example, the storage unit 205 of the terminal apparatus 2 stores FNWIDa corresponding to game A and FNWIDb corresponding to game B. When game B is selected during game A in the terminal apparatus 2, the acquiring unit 207 acquires the token corresponding to FNWIDa, which identifies the inviting user in game A being used, and is issued by the issuing unit 11 of the management server 3. The identifier reporting unit 208 sends to the management server 3, through the predetermined path, the set of the token acquired by the acquiring unit 207 and the FNWIDb corresponding to game B.

By doing so, even if a new account to be managed by the user is not set up in the management server 3, the management server 3 can manage, in association with each other, the account for the application server 4A and the account for the application server 4B, the servers being operated independently, by passing around the token through a predetermined path. In other words, it is not necessary for the user to be conscious of the management server 3. When the accounts of the same user for different games are associated in this manner, it is possible to provide the users with connected services related to the plurality of games. For example, in the connected services, it is possible to display, on a game screen of a game, a companion list in another game. Displaying the companion list enables connected services in which a companion in the other game can be invited to the game currently being used. As described above, the associating processing is executed when another game is selected in the terminal apparatus 2 of the user. Supposedly, if the associating processing is executed as required for all users irrespective of the selection of the other game, the processing load of the management server 3 increases. However, since the associating processing is executed at a timing at which a predetermined process takes place, such as when the other game is selected, in the present embodiment, efficient association can be made, and the processing load of the management server 3 decreases. The associating processing may be executed, not after the selection of the other game, but before the selection of the other game. In other words, the associating processing may be executed when the user requests the associating processing, which associates a plurality of FNWIDs. When the associating processing is executed at a timing at which a predetermined process occurs, as described above, the processing load of the management server 3 decreases in comparison with a case in which, when the same user has a plurality of FNWIDs, the associating processing is executed for a set of all FNWIDs.

The management unit 13 of the management server 3 acquires a companion list (example of relationship information) indicating specific relationships between users in each of the plurality of games from each of the plurality of application servers 4 and manages the list. Therefore, the companion lists managed separately by the plurality of application servers 4 can be collectively managed by the management server 3.

Here, in the game (example application) provided by each of the plurality of application servers 4 (example application apparatuses), specific relationships with other users are formed in the game. The specific relationships include, for example, if the application is a game, a companion relationship in which a user can cooperate with another user when proceeding in the game. Cooperation in the game means proceeding in the game together with a companion or making game data, such as the game ability value of a companion, available. The specific relationships may include a blocked relationship in which a companion relationship is refused or a competitor relationship in which a user recognizes another user as a competitor and the approval of the other user is not necessary. If the application is a communication application such as chatting, a chatting mate corresponds to a specific relationship.

The management server 3 also includes an accepting unit 14 for accepting, from the terminal apparatus 2 of a user who uses game A (example of first application), a companion list request (example acquisition request) for requesting a companion list (example relationship information) indicating a companion relationship associated with FNWIDb (example of second identification information), and a reporting unit 15 for reporting the companion list associated with FNWIDb to the terminal apparatus 2 that has sent the companion list request or to the application server 4A (example of first application apparatus). Here, when the reporting unit 15 reports the companion list to the application server 4A, the application server 4A reports the companion list to the terminal apparatus 2 of the user. In other words, the reporting unit 15 reports the companion list associated with FNWIDb to the terminal apparatus 2 directly or indirectly.

Therefore, the terminal apparatus 2 of a user who uses game A and game B can acquire, in game A, the companion list in game B. In other words, the companion list in one game can be acquired in another game. For example, even between games whose accounts are incompatible, it is possible to report information to a user who has a companion relationship in one game on the basis of an operation in another game. Target information to be reported includes, for example, message information or invitation information described later. When the management server 3 executes the inviting processing, the terminal apparatus 2 of the inviting user who uses game A can acquire a companion list in game B which receives the invitation. A user listed in the acquired companion list serves as a candidate for a user to be invited to game A.

The management server 3 further includes the invitation information management unit 16 (example of accumulator) that accepts an invitation request in which a request for an invitation to game A for a user to be invited, selected by the inviting user from among the companion list reported by the reporting unit 15, and that accumulates and manages the accepted invitation request. Therefore, it is possible to collectively manage who invites whom to which game (example application) in the management server 3.

Next, FIG. 2B shows an outline of a process for inquiring about an invitation request. In the terminal apparatus 2 of a user to be invited, an inquiry unit 201 sends an inquiry about whether an invitation to a game exists to the invitation information management unit 16 of the management server 3, the inquiry being made from a game being used in the terminal apparatus 2 from among the plurality of applications provided in the application system 100, game A, game B, game C, . . . .

For example, when the application system 100 provides game A, game B, game C, and game D, and when game B is available in the terminal apparatus 2 of the user to be invited, the terminal apparatus 2 sends, from game B, an inquiry about whether an invitation exists. More specifically, inquiring about an invitation request is performed by sending an invitation inquiry request to the management server 3. The inquiry unit 201 sends an inquiry about whether an invitation in which the user of the terminal apparatus 2 is a user to be invited exists to the invitation information management unit 16. It is preferable that the inquiry be sent when game B is activated in the terminal apparatus 2. It is not required, however, that the inquiry be made at activation, but the inquiry may be made while game B is being used. For example, when some information is sent to the management server 3, the inquiry request may be included in the information to be sent. Alternatively, the inquiry request may be sent when some event (an operation instruction from the user, for example) occurs while game B is being used.

When an inquiry about an invitation request is sent from the user of the terminal apparatus 2, if an invitation request in which the user of the terminal apparatus 2 is a user to be invited is accumulated in the invitation information management unit 16 (example of accumulator), the reporting unit 15 of the management server 3 reports to the terminal apparatus 2 invitation information indicating that the inviting user invites the user to be invited to game A. Therefore, even between games whose accounts are incompatible, a user who has a companion relationship in one game can be invited to another game.

On the other hand, the terminal apparatus 2 includes the inquiry unit 201 for sending an inquiry about whether invitation information indicating an invitation to game A (example of first application) exists to the invitation information management unit 16, which manages invitation information, from game B (example of second application) being used in the terminal apparatus 2 of the user to be invited, an invitation information receiving unit 202 for receiving the invitation information corresponding to the inquiry, a display unit 203, and a display control unit 204 for displaying, on the display unit 203, the details of the invitation on the basis of the invitation information. Therefore, even if an invitation related process, such as reporting an invitation to the terminal apparatus 2, is not executed in the application servers 4A, 4B, 4C, . . . , the terminal apparatus 2 can recognize an invitation from a user who is a companion in one game to another game being played by the user.

Here, the invitation information management unit 16 may be provided anywhere inside the application system 100, and may be provided, for example, in the management server 3 or in each of the application servers 4A, 4B, 4C, . . . .

A game (an example application) can have, for example, a not-running state, an active state in which some process is being executed, a background state in which nothing is displayed on the screen but some process is being executed, or a suspended state in which no processes are executed and the game is suspended. Activation of a game means that the game transits from the not-running state, or the suspended state to the active state. The end of a game means that the game transits from the active state to the not-running state, or the suspended state. When a plurality of games (applications) can be simultaneously in the active states, activation of a game means that one of the games transits to a state in which the user can operate the game, such as a state in which the game is displayed in the foremost on the screen. A LocalID is generated in the game (application) at any timing, such as when the game is first activated or when a tutorial finishes.

Installing a game (application) includes not only new introduction of the game program not yet introduced into the terminal apparatus 2 but also an update of the game program to be compatible with the application system 100. In other words, installing a game includes downloading an update program to be compatible with the application system 100 for the game installed in the terminal apparatus 2 to update the program therefor.

1.2 Structure of Management Server 3

FIG. 3 shows the structure of the management server 3. As shown in the figure, the management server 3 includes a central processing unit (CPU) 30 for controlling the entire server, a random access memory (RAM) 31 that functions as a work area for the CPU 30, a read only memory (ROM) 32 having stored therein a boot program and others, a hard disk 33 for storing various types of programs and data, an input unit 34 that includes a keyboard and a mouse, a display unit 35 for displaying an image, a communication interface (communication unit) 36 for communicating with an external device through the communication network NET, and a reading device 37 for reading data from an information recording medium such as a compact disc. The hard disk 33 includes, for example, a user information table TBL11, an ID management table TBL12, a companion relationship table TBL13, and an invitation table TBL14. When the CPU 30 executes various types of programs, the CPU 30 functions as the issuing unit 11, the receiving unit 12, the management unit 13, the accepting unit 14, the reporting unit 15, and the invitation information management unit 16. In other words, the various types of programs control the management server 3, which includes the CPU 30 (computer).

FIG. 4 shows the data structure of the user information table TBL11. The user information table TBL11 stores a plurality of records. Each record includes a record identification information ID that uniquely identifies the record, type information AppID (hereafter just called AppID) indicating the type of an application, a user nickname, the FNWID, a token, and a token issue date indicating the date on which the token was issued. For example, in a record having ID=1, FNWID is "XCV56714", and a token "56844SAS" was issued on Mar. 28, 2012 in association with the FNWID. The token issue date can be used for a case in which a valid period is specified for the issued token. As shown in FIG. 1, the application servers 4A, 4B, 4C, . . . include user information tables TBL11A, TBL11B, TBL11C, . . . , respectively, each having the above-described data structure.

FIG. 5 shows the data structure of the ID management table TBL12. The ID management table TBL12 stores a plurality of records. Each record includes a record identification information ID uniquely identifying the record, a RefID, and an FNWID. The FNWID is issued when an account is registered in each of the application servers 4A, 4B, 4C, . . . . In contrast, the RefID is issued when it is determined in the associating processing that an account in one game and an account in another game belong to the same user. In this example, the records having ID=1 and ID=2 have different friend network identification information FNWIDs "XCV56714" and "REK35460" and the same RefID 00000011. Therefore, "XCV56714" and "REK35460" are friend network identification information FNWIDs belonging to the same user.

FIG. 6 shows the data structure of the companion relationship table TBL13. The companion relationship table TBL13 stores a plurality of records. Each record stores, in association with one another, a record identification information ID, an AppID, group information Group indicating the type of relationship, companion-offer-source local identification information LocalID_From (hereafter called just LocalID_From) indicating the LocalID of the companion-offer-source user, companion-offer-destination local identification information LocalID_To (hereafter called just LocalID_To) indicating the LocalID of the companion-offer-destination user, companion-offer-source friend network identification information FNWID_From (hereafter called just FNWID_From) indicating the FNWID of the companion-offer-source user, companion-offer-destination friend network identification information FNWID_To (hereafter called just FNWID_To) indicating the FNWID of the companion-offer-destination, and state information Stat indicating the state of the companion offer.

It is advantageous in reducing the storage capacity that a companion relationship be recorded so as to include the companion-offer source and the companion-offer destination separately. If the LocalID of a user and the LocalIDs of all users with whom the user has companion relationships are stored in association with each other, twice the storage capacity is required. For example, it is assumed that user A is a companion-offer source and user B is a companion-offer destination. When the LocalIDs of users who have companion relationships with other users are stored for each user, it is necessary to store a companion relationship with user B for user A and also to store a companion relationship with user A for user B. In contrast, in the present embodiment, since the LocalID of the companion-offer destination and the LocalID of the companion-offer source are associated and stored in one record, the required storage capacity is halved. Even when the state information Stat is updated, the required processing is halved.

The relationship between a user and another user can be a companion relationship, a competitor relationship, or a blocked relationship. A companion relationship is established when a companion offer from a user is sent to another user and the other user approves the offer. A competitor relationship is established when a user makes a companion offer for another user whom the user considers to be a competitor, but the approval of the other user is not necessary. This is used, for example, when a user and another user play the same game and the user wants to register the other user as a competitor. A blocked relationship is established when a user asks for blocking another user whom the user wants to block, and the approval of the other user is not necessary, in the same way as the competitor relationship. This is used when companion offers are repeatedly received from the other user despite prior refusal, or when the other user troubles the user for some reason, such as an opinion on a bulletin board.

The group information Group specifies "Friends" for a record having a companion relationship, "Rival" for a record having a competitor relationship, and "Block" for a record having a blocked relationship. The state information Stat specifies "0" while a companion offer is pending, "1" after approval, and "2" after refusal. Since the competitor relationship and the blocked relationship are established just by a companion offer and a blocking request, respectively, it is not necessary to record the state information Stat. Therefore, the state information is set to "Null". The state information Stat may be always set to "0" for the competitor relationship and the blocked relationship.

For example, the record having ID=1 indicates that, in the game having an AppID 00000001, the user having a LocalID 00000011 has made a companion offer for the user having a LocalID 00003120 and the offer has been approved. The record having ID=1 is generated at a timing at which the user having a LocalID 00000011 makes a companion offer, and the state information Stat is set to "0", which indicates the companion offer is pending. The state information Stat is updated to "1" (approval) or "2" (refusal) when the user having a LocalID 00003120 receives the companion offer and approves or refuses it.

When a specific game is concerned by referring to the corresponding AppID in the companion relationship table TBL13, the companion relationships between the users in that game can be recognized. A user with whom a companion relationship has already been made or a companion to whom a companion offer has been made can be recognized by referring to the state information Stat. FNWID_To extracted from a record in which the FNWID of a specific user matches FNWID_From indicates the companion to whom the specific user has made a companion offer, and FNWID_From extracted from a record in which the FNWID of a specific user matches FNWID_To indicates the companion from whom the specific user has received a companion offer.

If a companion relationship is dissolved after the companion relationship was established, that record is deleted. Instead of deleting the record, the table may be configured such that a new item indicating whether a record is valid or invalid is added so that a record in which the companion relationship is dissolved is made invalid. If a companion relationship is established again with a user with whom a companion relationship was once dissolved, a new record needs to be generated.

As shown in FIG. 1, the application servers 4A, 4B, 4C, . . . each include companion relationship tables TBL13A, TBL13B, TBL13C, . . . , respectively Each companion relationship table TBL13A, TBL13B, TBL13C, . . . stores companion relationships for each game, and each record includes the record identification information ID, the group information Group, LocalID_From, LocalID_To, FNWID_From, FNWID_To, and the state information Stat indicating the state of the companion offer. When a companion relationship is changed in any of the application servers 4A, 4B, 4C, . . . and the stored content in the corresponding companion relationship table TBL13A, TBL13B, TBL13C, . . . is changed, a change notice is sent from the application server 4A, 4B, 4C, . . . to the management server 3, and the change in the companion relationship is reflected in the companion relationship table TBL13, thus synchronizing the stored contents.

Figures 7, 8:
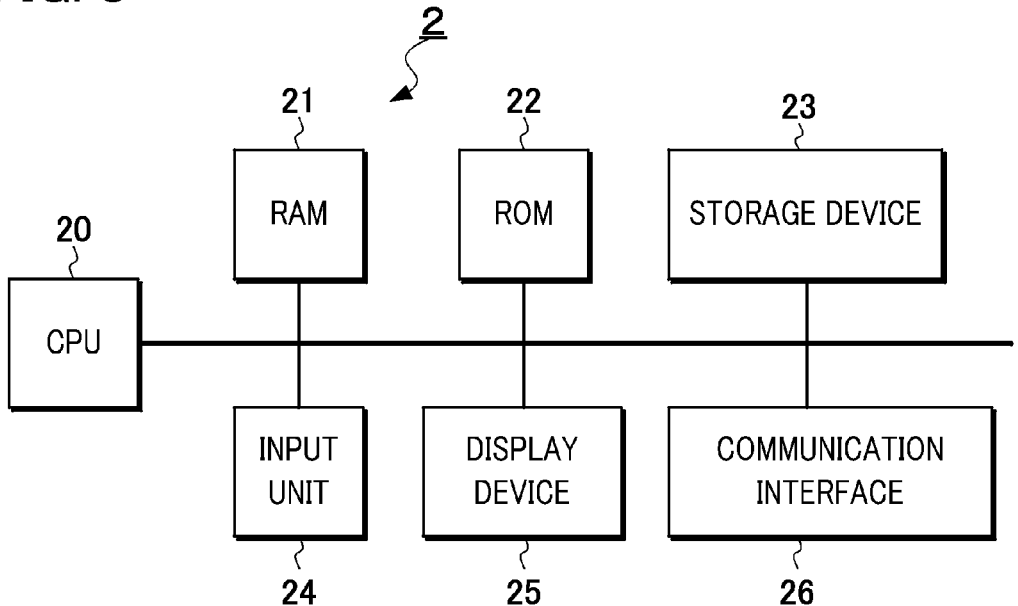
FIG. 7 is a view showing an example data structure of an invitation table.
FIG. 8 is a block diagram showing a structure of a terminal apparatus.

FIG. 7 shows the data structure of the invitation table TBL14. The invitation table TBL14 stores a plurality of records. Each record includes a record identification information ID, inviting-game type information InviteAppID (hereafter just called InviteAppID), friend network identification information InviteFNWID_From of the inviting user (hereafter just called InviteFNWID_From), friend network identification information InviteFNWID_To of the user to be invited (hereafter just called InviteFNWID_To), and the nickname of the inviting user, corresponding to the invited game. By referring to the invitation table TBL14, it can be recognized that there is a game to which a user is invited.

1.3 Structure of Terminal Apparatus 2

FIG. 8 shows the structure of the terminal apparatus 2. The terminal apparatus 2 constitutes the application system 100 together with the management server 3 (example management apparatus), which issues and manages identification information (FNWID) uniquely identifying a user with regard to each of the plurality of application servers 4 (example application apparatuses) providing users with applications, such as games, different from each other, and manages plural pieces of identification information corresponding to the plurality of application servers 4 for the same user, by associating the plural pieces of identification information. An apparatus constituting the application system 100, such as the management server 3, includes the invitation information management unit 16 for managing invitation information inviting, a user to game A (example of first application) being used by the inviting user, with the user being invited having a specific relationship with the inviting user in game B (example of second application).

The terminal apparatus 2 includes a CPU 20 for controlling the entire apparatus, a RAM 21 that functions as a work area for the CPU 20, a ROM 22 having stored therein a boot program and other data, a storage device 23 for storing various types of programs and data, an input unit 24 that includes a ten-key pad and touch sensitive keys, a display device 25 for displaying an image, and a communication interface 26 for communicating with an external device through the communication network NET. The storage device 23 stores various types of applications, such as games, FNWIDs corresponding to each application available in the terminal apparatus 2, and a control program for controlling the entire apparatus.

The storage device 23 corresponds to the storage unit 205 shown in FIG. 1, and the display device 25 corresponds to the display unit 203. The CPU 20 executes the control program, whereby the CPU 20 functions as the inquiry unit 201, the invitation information receiving unit 202, the display control unit 204, a selection unit 206, the acquiring unit 207, the identifier reporting unit 208, and an invitation request sending unit 209. In other words, the control program controls the terminal apparatus, which has the CPU 20 (computer) and the display device 25.

When an application installed in the terminal apparatus 2 is compatible with the application system 100, the program of a software development kit (SDK) may be incorporated in the program of that application. The SDK is formed of a collection of application programming interfaces (APIs) that mediate between the application installed in the terminal apparatus 2 and the management server 3. When an application in which the SDK has been incorporated is executed in the terminal apparatus 2, the terminal apparatus 2 can be made to function as the inquiry unit 201, which sends an inquiry about whether invitation information indicating an invitation to game A (example of first application) exists to the invitation information management unit 16 of the management server 3, with the invitation being made from game B (example of second application) being used in the terminal apparatus 2 of the user to be invited, the invitation information receiving unit 202, which receives the invitation information corresponding to the inquiry, and as the display control unit 204, which displays, on the display unit 203, the details of the invitation on the basis of the invitation information. In other words, the SDK can be understood as a program incorporated into the control program of game A or game B installed in the terminal apparatus, which has the CPU 20 (computer) and the display device 25 (example display unit).

Furthermore, the terminal apparatus 2 can be understood as including the inquiry unit 201, the invitation information receiving unit 202, and the display control unit 204. The invitation information management unit 16 is provided for the management server 3, and the inquiry unit 201 sends an inquiry about whether invitation information exists to the invitation information management unit 16 of the management server 3.

Accordingly, a user who wants to make an invitation to a game that the user is currently playing (for example, game A) is allowed to invite a companion in another game (for example, game B), the games having incompatible accounts, and the user who is invited is able to know the invitation to the inviting game. In other words, an invitation from a user who is a companion in a game (for example, game B) to another game being played by the user (for example game A) can be recognized.

The terminal apparatus 2 may be configured such that, when an application in which an SDK has been incorporated is executed in the terminal apparatus 2, the terminal apparatus 2 can function as the selection unit 206 for selecting game B in game A being used in the terminal apparatus 2 of the inviting user, the acquiring unit 207, which acquires the token (example identifier) that corresponds to identification information identifying the inviting user, corresponding to game A, and that was issued by the management server 3 (example management apparatus), and as the identifier reporting unit 208, which reports to the management server 3, through the predetermined path, a pair of the token acquired by the acquiring unit 207 and the identification information identifying the inviting user, corresponding to game B selected by the selection unit 206. The terminal apparatus 2 can be understood as additionally including the selection unit 206, the acquiring unit 207, and the identification reporting unit 208. Accordingly, it is possible for the management server 3 to associate accounts used in different games operating in the same terminal apparatus 2.

If an application installed in the terminal apparatus 2 is a version that is not compatible with the application system 100, when a version that includes an SDK can be downloaded, the version of the program of the application installed in the terminal apparatus 2 is updated, allowing the application to be compatible with the application system 100. In other words, the application programs at the application servers 4A, 4B, 4C, . . . are configured so as to be able to incorporate an SDK.

An SDK is provided, for example, by the business entity that manages the management server 3. In that case, the service providing entities of the application servers 4A, 4B, 4C, . . . provide the application programs to the users of the terminal apparatuses 2 after incorporating the SDK program provided by the business entity that manages the management server 3 into the application programs of game A, game B, game C, . . . .

2. Operation of Application System

The operation of the application system 100 will be described in terms of (1) FNWID acquiring processing, (2) companion-relationship synchronizing processing, and (3) inviting processing.

2.1 FNWID Acquiring Processing

Figure 9:
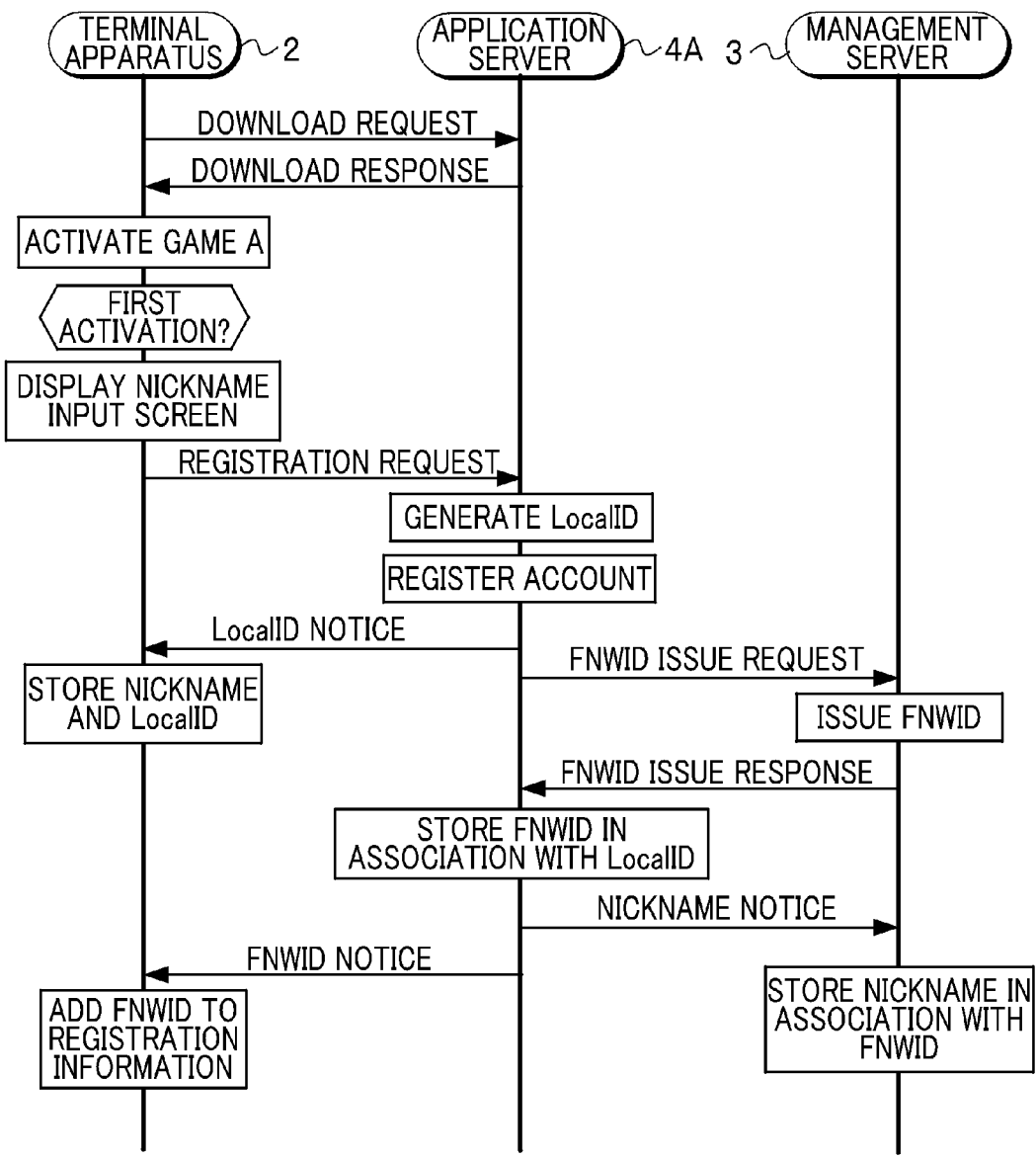
FIG. 9 is a sequence chart showing details of acquiring processing for acquiring friend network identification information.

FIG. 9 shows details of the FNWID acquiring processing. In this example, it is assumed that a user acquires the program of game A from the application server 4A, and FNWIDa is acquired in that process.

When the user operates the terminal apparatus 2 to access a downloading site for game A and selects downloading of game A, the terminal apparatus 2 sends a downloading request to the application server 4A. When the application server 4A receives the downloading request, the application server 4A sends a downloading response that includes the program of game A to the terminal apparatus 2. The downloading site may be a server operated by a third party.

Then, when the user activates game A, game A in the terminal apparatus 2 determines whether this is the initial activation according to whether registration information has already been stored by referring to the storage area managed by game A. When it is determined that this is the initial activation based on the fact that registration information has not been stored, game A makes the terminal apparatus 2 display a screen for asking the user to input a nickname. When the user operates the terminal apparatus 2 to input a nickname, the terminal apparatus 2 sends a registration request that includes the nickname to the application server 4A. When the application server 4A receives the registration request, the application server 4A generates local identification information LocalIDa, stores the nickname and the local identification information LocalIDa in the user information table TBL11A, and executes account registration.

Then, the application server 4A reports the generated local identification information LocalIDa or identification information associated with the local identification information LocalIDa, to the terminal apparatus 2. The terminal apparatus 2 receives the local identification information LocalIDa or the identification information associated with the local identification information LocalIDa, reported by the application server 4A, associates the information with the nickname, and stores them as registration information in the storage area managed by game A. When the terminal apparatus 2 communicates with the application server 4A thereafter, if the local identification information LocalIDa or the identification information associated with the local identification information LocalIDa, stored as the registration information in the terminal apparatus 2 is included, the application server 4A can identify the user. When the identification information associated with the local identification information LocalIDa is used as identification information reported to the terminal apparatus 2, instead of the local identification information LocalIDa, the identification information is associated with the local identification information LocalIDa and is stored in the user information table TBL11A.

Then, the application server 4A sends an FNWID issue request to the management server 3. When the management server 3 receives the FNWID issue request, the management server 3 issues FNWIDa that uniquely identifies the user and sends back an FNWID issue response that includes the issued FNWIDa to the application server 4A. When the application server 4A receives the FNWID issue response, the application server 4A stores FNWIDa in association with the local identification information LocalIDa in the user information table TBL11A.

Next, the application server 4A sends a nickname notice that includes the nickname and FNWIDa to the management server 3. When the management server 3 receives the nickname notice, the management server 3 stores the nickname in association with FNWIDa. The application server 4A also sends FNWIDa to the terminal apparatus 2. When the terminal apparatus 2 receives FNWIDa, the terminal apparatus 2 adds FNWIDa to the registration information stored in the storage area managed by game A and stores FNWIDa therein.

In the above-described example, the application server 4A generates the local identification information LocalIDa, which serves as the account of the user. The user may be asked to input unique alphanumeric characters as the account. An email address may be used as the account.

In this manner, when the user downloads the program of game A into the terminal apparatus 2 and activates game A, FNWIDa is issued by the management server 3 and the issued FNWIDa is stored in the management server 3, the application server 4A, and the terminal apparatus 2, the activation of game A being used as a trigger. In this case, the user of the terminal apparatus 2 just needs to set up an account in the application server 4A, but does not need to additionally set up an administrative account in the management server 3, which the user manages.

2.2 Companion-Relationship Synchronizing Processing

Figure 10:
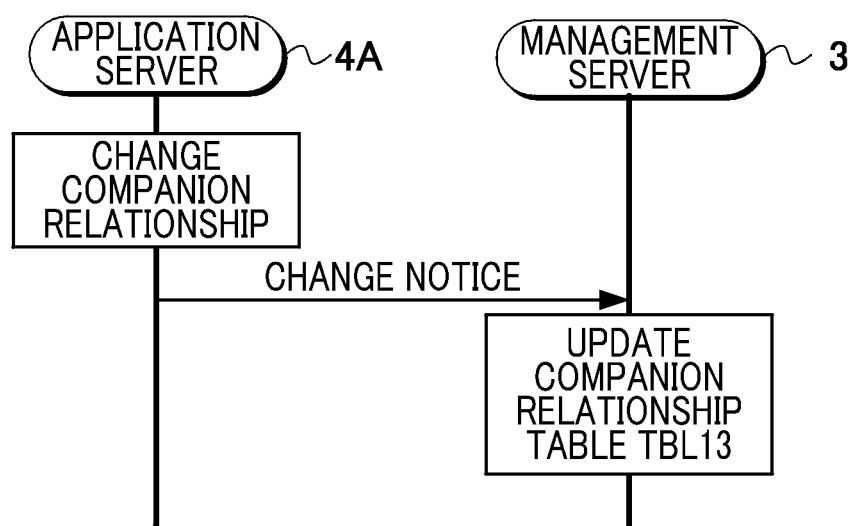
FIG. 10 is a sequence chart showing details of companion relationship synchronizing processing.

Next, FIG. 10 shows details of the companion-relationship synchronizing processing. When the companion relationship is changed and the storage contents of the companion relationship table TBL13A are changed in the application server 4A, the application server 4A sends a change notice to the management server 3. The change notice includes the change in the companion relationship table TBL13A. For example, the application server 4A may include a changed record in the change notice and may send the notice. When the management server 3 receives the change notice, the management server 3 reflects the companion relationship change in the companion relationship table TBL13 to update the storage contents.

In this manner, the companion relationships managed by the application servers 4A, 4B, 4C, . . . are collectively recognized by the management server 3.

2.3 Inviting Processing

Figure 11:
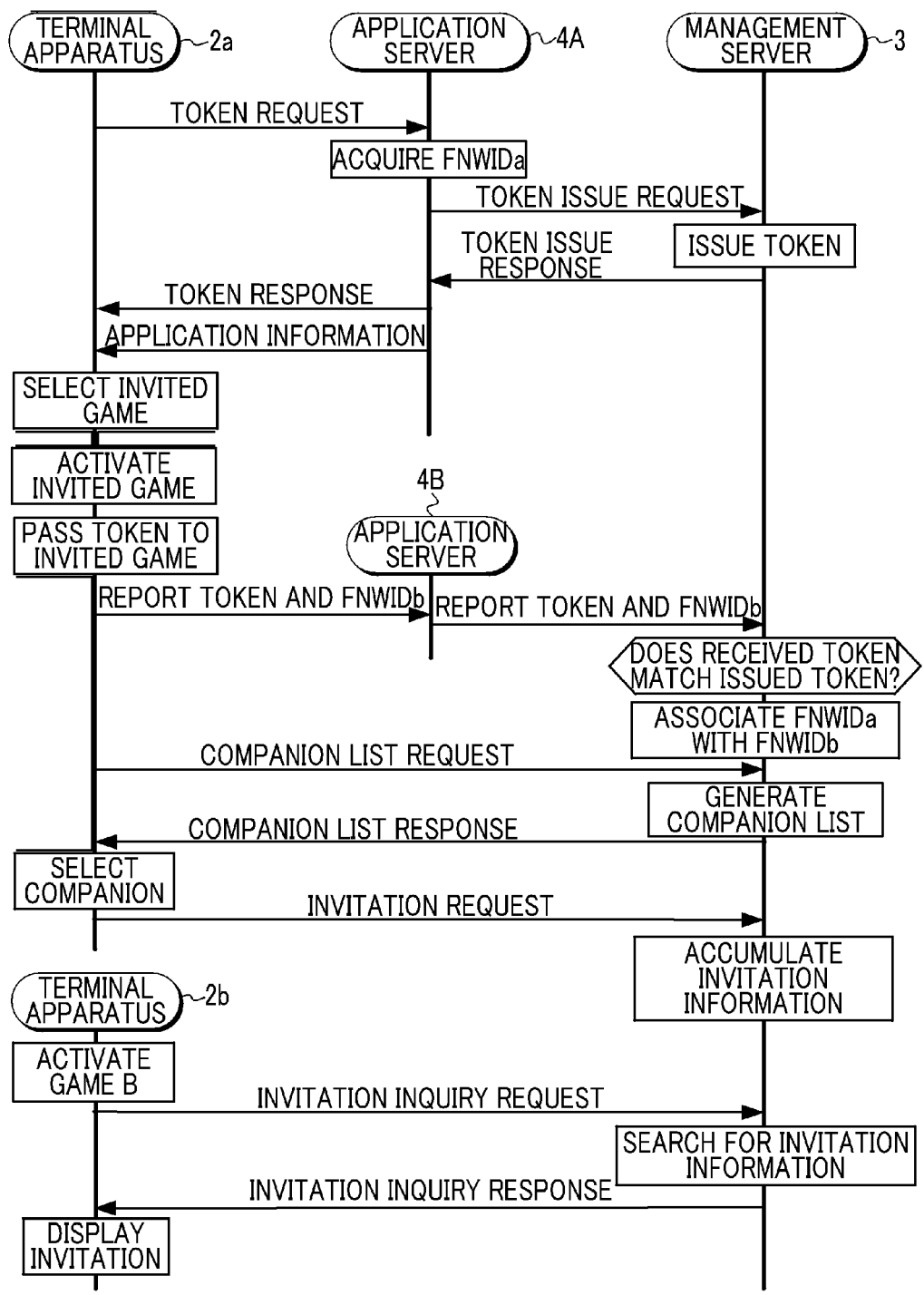
FIG. 11 is a sequence chart showing details of inviting processing.

FIG. 11 shows details of the inviting processing. In this example, it is assumed that an inviting user who plays both game A and game B invites another user, as an invited user, who is a companion of the inviting user in game B, to game A. It is also assumed that FNWID of the inviting user, corresponding to game A, is FNWIDa, FNWID of the inviting user, corresponding to game B, is FNWIDb, a reference symbol 2a is assigned to the terminal apparatus of the inviting user, and a reference symbol 2b is assigned to the terminal apparatus of the invited user.

When the inviting user operates the terminal apparatus 2a to activate game A and selects an invitation page for inviting a companion in another game to game A, the terminal apparatus 2a sends a token request to the application server 4A. The application server 4A, upon receiving the token request, acquires FNWIDa for the inviting user of terminal apparatus 2a. For example, when the token request includes FNWIDa, the application server 4A needs to acquire FNWIDa included in the token request. Alternatively, when the token request includes the local identification information LocalIDa or the nickname, the application server 4A needs to refer to the user information table TBL11A to acquire FNWIDa corresponding to the local identification information LocalIDa or the nickname.

Then, the application server 4A sends a token issue request that includes the acquired FNWIDa to the management server 3. When the management server 3 receives the token issue request, the management server 3 issues a token, associates the issued token with FNWIDa included in the token issue request, and stores the token in the user information table TBL11. For example, when it is assumed that FNWIDa is "XCV56714" and the token is "56844SAS", "56844SAS" is associated with "XCV56714" and is stored in the user information table TBL11, as shown in FIG. 4.

Then, the management server 3 sends a token issue response that includes the issued token to the application server 4A. When the application server 4A receives the token issue response, the application server 4A sends a token response that includes the token to the terminal apparatus 2a. The application server 4A acquires in advance application information that indicates details of game B, game C, . . . provided by the other application servers 4B, 4C, . . . belonging to the application system 100, from the management server 3. The application server 4A sends the acquired application information to the terminal apparatus 2a.

When the terminal apparatus 2a receives the application information, the terminal apparatus 2a displays, on the display device 25, an invitation page on which the user can select one or a plurality of games on the basis of the application information. When the inviting user selects an invited game in which an invitation is made (in this embodiment, game B), the invited game is activated.

If the invited game selected in the terminal apparatus 2a has not been installed or has been uninstalled, so that the invited game cannot be activated, a message indicating that this process cannot be performed is displayed on the display device 25. When game B, which is the invited game, is activated and the token is passed from game A to game B, the terminal apparatus 2a reports FNWIDb, which is FNWID corresponding to game B, and the passed token to the application server 4B. The inviting processing may be configured such that a game or games installed in the terminal apparatus 2a are identified, and an invitation page on which only these games can be selected is displayed on the display device 25.

When the application server 4B receives FNWIDb and the token, the application server 4B reports them to the management server 3. When the management server 3 receives FNWIDb and the token, the management server 3 determines whether the received token matches an issued token. For example, the management server 3 searches the user information table TBL11 and determines whether an issued token that matches the received token is found. This determination may be made such that a token having an expired valid date is made invalid by referring to the issue date of each token.

In this example, it is assumed that the received token matches an issued token. In that case, the management server 3 associates FNWIDa with FNWIDb. For example, the management server 3 stores an identical RefID for both FNWIDa and FNWIDb in the ID management table TBL12. For example, when it is assumed that FNWIDa is "XCV56714" and FNWIDb is "REK35460", an identical RefID of "00000011" is stored in the ID management table TBL12, as shown in FIG. 5.

Then, game A of the terminal apparatus 2a sends a companion list request to the management server 3. The companion list request includes type information AppID indicating that the inviting game is game A and FNWIDa of the inviting user. When the management server 3 receives the companion list request, the management server 3 extracts at least one user having a companion relationship with the inviting user in game B as a candidate user to be invited.

More specifically, the CPU 30 of the management server 3 refers to the ID management table TBL12 to acquire RefID corresponding to FNWIDa of the inviting user, and then extracts FNWIDb of the inviting user, having the same RefID and corresponding to game B. For example, in the example shown in FIG. 5, when FNWIDa is "XCV56714", since RefID associated with "XCV56714" is "00000011", the CPU 30 acquires "00000011" as RefID associated with FNWIDa. Then, the CPU 30 extracts another FNWID having a RefID of "00000011". In this example, "REK35460" (the above-described FNWIDb) is extracted. The extracted FNWIDb is an FNWID corresponding to another game played by the inviting user. The extracted FNWIDb can be identified as the FNWID corresponding to game B when the corresponding AppID is referenced in the user information table TBL11. In other words, by executing the above-described associating processing, the FNWID (in this example, FNWIDb=REK35460) corresponding to a game (game B) different from game A, to which the inviting user invites someone, can be identified.

Next, the CPU 30 refers to the companion relationship table TBL13 to identify at least one companion in a game (in this example, game B) different from game A, to which the inviting user invites someone. More specifically, FNWID acquired by extracting FNWID_To from a record which has the AppID indicating game B from which a companion is to be invited and for which FNWIDb of the inviting user matches FNWID_From, and FNWID acquired by extracting FNWID_From from a record which has the AppID indicating game B and for which FNWIDb matches FNWID_To indicate altogether companions in the invited game (game B). Therefore, the extracted FNWID is FNWIDb of a companion, corresponding to game B.

In this case, the state information Stat in the record having an extracted FNWID is referenced and if the state indicates "0", which means that a companion offer is pending, or "2", which means refusal, the FNWID is excluded from the extraction result. However, because "0", which means that a companion offer is pending, shows a possibility of being a companion, the corresponding FNWID may be included in the extraction result.

Then, the CPU 30 identifies, from among at least one FNWIDb (hereafter called a first FNWID), one not associated with FNWID corresponding to game A (hereafter called a second FNWID) as FNWID of a candidate user to be invited. This is because, when it is clear that a companion in the invited game has already used the inviting game (game A), that companion needs to be excluded from candidates for users to be invited.

More specifically, the CPU 30 first refers to the ID management table TBL12 to identify RefID corresponding to each of the extracted first FNWIDs (a first process). In this first process, there is a case in which the ID management table TBL12 includes no record having the first FNWID. In that case, since the CPU 30 cannot identify a corresponding RefID, the processing does not proceed to a second or third process, described later, and the first FNWID is treated as FNWID of a candidate user to be invited.

Second, the CPU 30 identifies a second FNWID according to the identified RefID (a second process). In other words, the CPU 30 identifies a second FNWID having the same RefID. Third, the CPU 30 refers to the user information table TBL11 to determine whether the second FNWID is an FNWID corresponding to game A (a third process). In other words, it is determined whether the corresponding AppID indicates game A in the record having the second FNWID. When it is determined that the second FNWID is not an FNWID corresponding to game A, that is, that the second FNWID is an FNWID corresponding to a game other than game A, the first FNWID corresponding to this second FNWID is treated as FNWID of a candidate user to be invited. On the other hand, if it is determined that the second FNWID is an FNWID corresponding to game A, that companion is not treated as a candidate user to be invited.

Next, the CPU 30 refers to the user information table TBL11 to generate a companion list that includes at least one set formed of FNWID of the candidate for a user to be invited, the nickname corresponding to FNWID of the candidate for a user to be invited, with the nickname being used in the game in which an invitation is made (game B), and the AppID (AppIDb indicating game B). The management server 3 sends a companion list response that includes the companion list to the terminal apparatus 2a.

When the terminal apparatus 2a receives the companion list response, the terminal apparatus 2a displays the nickname of the at least one companion (candidate user to be invited) for each game name on the display device 25. In the present embodiment, since game B is the invited game, the FNWID associated with the token Tx and FNWIDa corresponding to game A for the inviting user is only FNWIDb corresponding to game B. Therefore, the nickname of the at least one companion displayed on the display device 25 is only that for game B. When a plurality of other games are treated as invited games, a companion list that includes a companion in each of the plurality of games is generated, and the nickname of the companion is displayed for each game name. In that case, FNWIDa corresponding to game A is associated with FNWIDs corresponding to the plurality of other games in the associating processing.

When the inviting user operates the terminal apparatus 2a to select a companion to be invited, the terminal apparatus 2a (the invitation request sending unit 209) sends an invitation request that includes invitation information to the management server 3. This invitation information includes FNWIDa of the inviting user, corresponding to the inviting game A, FNWIDb of a user to be invited, corresponding to the invited game B, where a companion to be invited plays, and AppID of the inviting game A. It is also possible to select a plurality of companions.

Next, when the management server 3 receives the invitation request, the management server 3 stores a record including the invitation information in the invitation table TBL14. As described above, each record in the invitation table TBL14 includes InviteAppID, InviteFNWID_From, InviteFNWID_To, and the nickname of the inviting user, corresponding to the invited game. In this example, it is assumed that FNWID of a user to be invited is FNWIDb, and that the user to be invited has a companion relationship with the inviting user in game B. Therefore, in each record in the invitation table TBL14, InviteAppID is AppIDa of game A, InviteFNWID_From is FNWIDa of the inviting user, and InviteFNWID_To is FNWIDb of the user to be invited. The CPU 30 acquires the nickname of the inviting user in game B, where the inviting user has a companion relationship with the user to be invited. More specifically, the CPU 30 first identifies FNWIDa of the inviting user, the FNWIDa being included in the invitation request. Second, the CPU 30 refers to the ID management table TBL12 to acquire RefID corresponding to FNWIDa of the inviting user. Third, the CPU 30 refers to the ID management table TBL12 to extract FNWID (FNWIDb) of the inviting user, stored in association with the acquired RefID. Fourth, the CPU 30 refers to the user information table TBL11 to identify a record associated with the extracted FNWID (FNWIDb) of the inviting user and to acquire the nickname of the inviting user, included in the record.

Then, the CPU 30 stores AppIDa of the inviting game A, FNWIDa of the inviting user, corresponding to game A, FNWIDb of the user to be invited, corresponding to game B, and the nickname of the inviting user in the invited game B, in the invitation table TBL14. The invitation table TBL14 functions as the invitation information management unit 16 (see FIG. 1), which accumulates invitation information.

Then, when the user to be invited operates the terminal apparatus 2b to activate game B, the inquiry unit 201 of the terminal apparatus 2b sends an inquiry request to the management server 3 during the use of game B. The invitation inquiry request includes FNWIDb of the user to be invited, corresponding to game B. Even when any of game A, game B, game C, . . . belonging to the application system 100 is activated, an invitation inquiry request is sent to the management server 3 during the execution of the activated game.

Next, when the management server 3 receives the invitation inquiry request, the management server 3 searches for the invitation information. More specifically, the CPU 30 refers to the invitation table TBL14 to identify a record in which FNWIDb is recorded as InviteFNWID_To and to identify the nickname of the inviting user, corresponding to game B, and AppIDa indicating the inviting game A in that record. AppIDa may include link information indicating the address of a site where the inviting game A can be downloaded. In this manner, the CPU 30 functions as the invitation information management unit 16. Then, the CPU 30 sends an invitation inquiry response that includes the nickname and AppIDa, which is the identified invitation information, to the terminal apparatus 2b through the communication interface 36. In this case, the CPU 30 functions as the reporting unit 15.

Then, when the terminal apparatus 2b receives the invitation inquiry response, the terminal apparatus 2b displays, on the display device 25, the nickname of the inviting user, the name of a game to which the user to be invited is invited, and the link information. More specifically, the invitation information receiving unit 202 (the CPU 20) of the terminal apparatus 2b receives the invitation inquiry response that includes the invitation information, and the display control unit 204 (the CPU 20) displays invitation details on the display device 25.

By doing so, the user to be invited can understand that the inviting user with whom a companion relationship has been made in game B has made an invitation to game A.

As described above, the terminal apparatus 2 may be configured so as to function as the invitation request sending unit 209, which sends to the management server 3 an invitation request for a user who receives an invitation (user to be invited) among a user having a specific relationship (a candidate user to be invited) with a user (inviting user) in game B selected by the selection unit 206. This invitation request serves as a basis for invitation information managed by the management server 3. Also, the terminal apparatus 2 can be understood as additionally including the invitation request sending unit 209.

Since game B is activated on the basis of operations in game A and the activated game B sends an invitation request to the management server 3 in this manner, it is possible for a user who is playing game A to invite another user who is a companion of the user in game B to game A. In other words, even between games for which accounts are incompatible, it is possible to invite a user having a companion relationship in a game on the basis of operations in another game. Here, game B activated on the basis of operations in game A differs in operation from game B activated when a user plays game B. In other words, game B activated on the basis of operations in game A performs the inviting processing.

3. Modifications

The present invention is not limited to the above-described embodiment. Various types of modifications described below are possible. It is also a matter of course that each modification and the embodiment may be combined appropriately.

(1) In the above embodiment, the application servers 4A, 4B, 4C, . . . are incorporated into the application system 100 from the beginning. The present invention is not limited to that case. An application server may be incorporated into the application system 100 that has already been operating.

For example, it is assumed that the application server 4A has been operating independently, and the application server 4A is applied anew to the application system 100. In that case, the program of game A needs to be updated in the terminal apparatus 2. This is because game A does not have a function for passing a token to the program of another game or an inviting processing function since game A just needs to operate on the application server 4A when the application server 4A has been operating independently.

Figure 12:
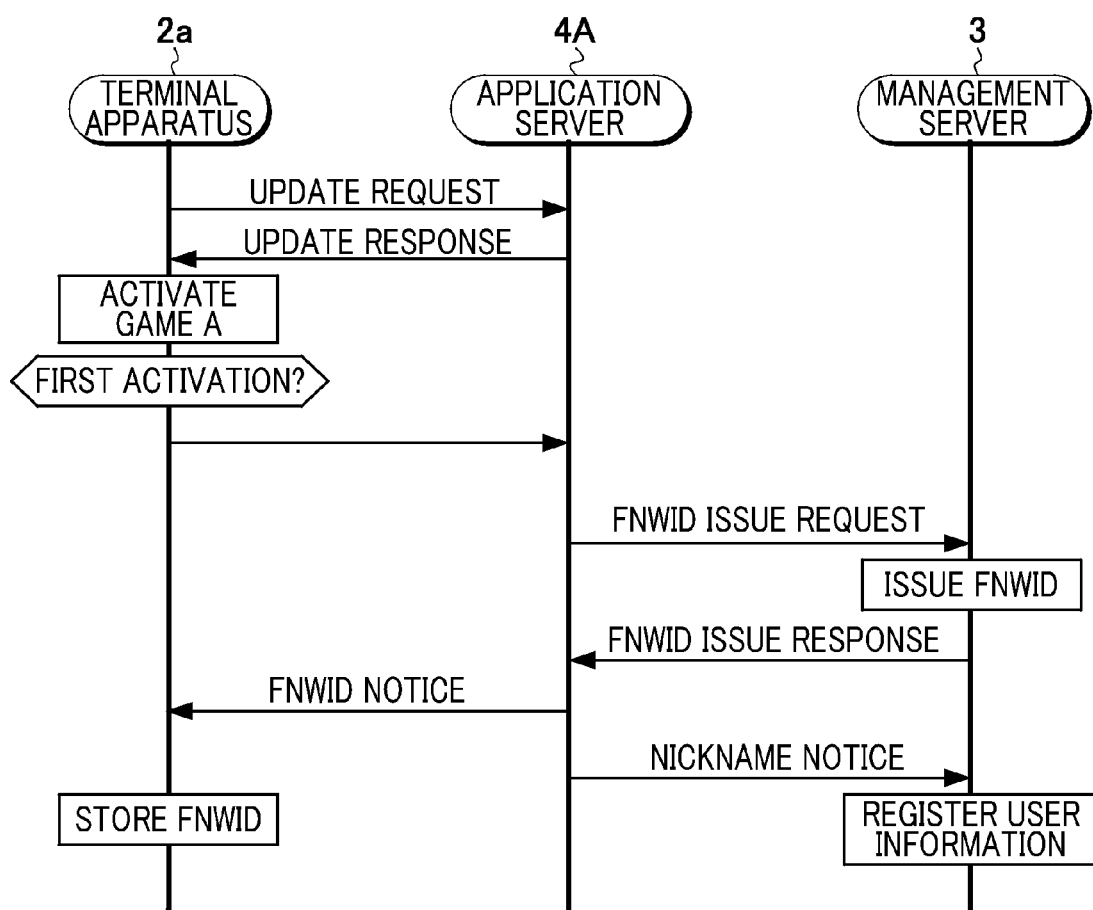
FIG. 12 is a sequence chart showing details of acquiring processing for acquiring friend network identification information according to a modification.

FIG. 12 shows FNWID acquiring processing according to a modification. In this modification, it is assumed that the application server 4A has been incorporated anew into the application system 100.

First, a user operates the terminal apparatus 2a to access a downloading site for game A. Then, a screen for prompting the user to install the update program is displayed on the display device 25. When the user operates the terminal apparatus 2a to select updating, the terminal apparatus 2 sends an update request to the application server 4A. When the application server 4A receives the update request, the application server 4A sends back an update response that includes the update program to the terminal apparatus 2a.

Next, when the terminal apparatus 2a receives the update response, the update program of game A is installed into the terminal apparatus 2a. In the installation of the update program, the nickname and LocalID used in the preceding game A are handed over as a part of registration information.

When game A is activated, it is determined whether this is the initial activation according to whether FNWID has already been stored in the storage area managed by game A of the terminal apparatus 2a during the use of game A. When it is determined that this is the initial activation based on the fact that FNWID has not been stored, the terminal apparatus 2a sends an initial activation notice indicating that the initial activation was performed to the application server 4A.

When the application server 4A receives the initial activation notice, the application server 4A sends an FNWID issue request to the management server 3. When the management server 3 receives the FNWID issue request, the management server 3 issues FNWIDa and sends back an FNWID issue response that includes the issued FNWIDa to the application server 4A. When the application server 4A receives the FNWID issue response, the application server 4A stores FNWIDa in the user information table TBL11A in association with the nickname and the local identification information LocalIDa. The application server 4A also reports FNWIDa to the terminal apparatus 2a. The terminal apparatus 2a stores FNWIDa in association with game A.

Next, the application server 4A sends a nickname notice that includes the nickname and FNWIDa to the management server 3. When the management server 3 receives the nickname notice, the management server 3 stores the nickname and FNWIDa into the user information table TBL11.

In this manner, when the user downloads the update program of game A into the terminal apparatus 2a and activates the update program, FNWIDa is issued by the management server 3 and the issued FNWIDa is stored in the management server 3, the application server 4A, and the terminal apparatus 2a. In this case, the user of the terminal apparatus 2a does not need to newly set up an administrative account managed by the user in the management server 3.

In this modification, FNWID is issued to a user who activates game A for the first time. Therefore, it is advantageous that the management server 3 does not need to manage FNWID of a user who has not yet used game A even if the user downloads the update program into the terminal apparatus 2.

When a user installs the update program and then activates the program, the FNWID issue process may be collectively executed between the application server 4A and the management server 3 also for a user who has a companion relationship with the user. However, for a user having a companion relationship but already having FNWID issued, FNWID is not issued anew. In that case, when a user having a companion relationship installs the update program and then activates the program, the application server 4A may report FNWID to the terminal apparatus 2 of the user having a companion relationship.

(2) In the above-described embodiment and modification, games are taken as examples of applications. The present invention is not limited to these examples. The present invention can be applied to any applications. For example, the applications may include a chatting application and a photo and video sharing application. A specific relationship with another user in an application is, for example, a companion or a competitor in a game, a chatting friend in a chatting application, and a companion with whom photos and videos can be shared in a photo and video sharing application. In other words, the present invention can also be applied to any applications in which the whole or a part of the services and functions provided by the applications is different between users having a specific relationship and users having no specific relationship.

(3) In the above-described embodiment and modifications, a companion relationship in which a user and another user help each other when executing an application is taken as an example. The present invention is not limited to this example. The present invention can be applied to a case in which a specific relationship with another user is formed in an application. The companion relationship may be established when a user asks another user to have the companion relationship and the other user approves it. The specific relationship may include, in addition to a companion relationship, a blocked relationship in which having a companion relationship is refused, or a competitor relationship in which a user considers another user as a competitor and the approval of the other user is not necessary.

(4) In the above-described embodiment and modifications, the terminal apparatus 2 that uses game A sends a companion list request for requesting a companion list indicating a companion relationship associated with FNWID corresponding to game B, to the management server 3; and the management server 3 includes the accepting unit 14 for accepting the companion list request and the reporting unit 15 for sending the companion list to the terminal apparatus 2. The present invention is not limited to this case. The accepting unit 14 may accept the companion list request from the application server 4A that provides game A, and the reporting unit 15 may send the companion list to the application server 4A. In that case, the application server 4A intervenes between the terminal apparatus 2 and the management server 3. In other words, the terminal apparatus 2 sends the companion list request to the application server 4A, and the application server 4A, upon receiving the companion list request, sends the companion list request to the management server 3. The management server 3, upon receiving the companion list request, sends the companion list to the application server 4A, and the application server 4A receives the companion list and then sends the companion list to the terminal apparatus 2.

(5) In the above-described embodiment and modifications, when the management server 3 receives an invitation request from the terminal apparatus 2, the invitation information management unit 16 accumulates the invitation request. The present invention is not limited to this case. The management server 3 need not be provided with the invitation information management unit 16. In that case, when the management server 3 receives, from the terminal apparatus 2, an invitation request for inviting a user to be invited who uses game B to game A, the reporting unit 15 needs to send invitation information indicating an invitation to game A, to the application server 4B corresponding to the user to be invited. The application server 4B includes the invitation table TBL14 and accumulates the invitation information (the invitation information management unit 16). After the user to be invited activates game B in the terminal apparatus 2, the inquiry unit 201 of the terminal apparatus 2 sends an inquiry about an invitation request to the application server 4B corresponding to the activated game B. The application server 4B needs to determine whether the invitation information for the user to be invited has been accumulated in the invitation table TBL14 and to send the invitation information to the terminal apparatus 2 of the user to be invited. In other words, the invitation information management unit 16 is provided for each of the plurality of application servers 4, and the inquiry unit 201 sends an inquiry about whether the invitation information is found to the invitation information management unit 16 of the application server 4 corresponding to the application that is activated in the terminal apparatus.

In this manner, when an invitation request for a user to be invited is found, the user to be invited being selected by the inviting user from among the companion list (example relationship information) reported by the reporting unit 15 of the management server 3, the reporting unit 15 sends invitation information indicating that the inviting user makes an invitation to game A (example of the first application), to the application server 4B (example of the second application apparatus) corresponding to the user to be invited. In this way, various alternative embodiments can be employed for accumulating invitation requests.

(6) In the above-described embodiment and modifications, the token passed from game A to game B is sent together with FNWIDb from the terminal apparatus 2 through the application server 4B to the receiving unit 12 of the management server 3. The present invention is not limited to this case. The management server 3 may acquire the token through any route. For example, the terminal apparatus 2 may directly send the token to the management server 3, and the receiving unit 12 may receive the token. In other words, the token Tx issued in association with FNWIDa in the management server 3 may be sent from game A of the terminal apparatus 2 through game B of the terminal apparatus 2 to the management server 3.

In the above-described embodiment and modifications, the token is passed from game A to game B on the basis of an operation of the inviting user in the terminal apparatus 2. The present invention is not limited to this case. The token may be passed from game A to game B not on the basis of an operation of the inviting user but on the basis of an automatic process of game A. Alternatively, the token may be passed from game A to game B on the basis of a program process activated by game A and operating in the terminal apparatus 2.

The following aspects of the invention are understood from the embodiments and modifications described in the foregoing.

From the foregoing description, in one aspect, it can understood from the above description that the present invention provides a management apparatus that has a communication unit for communicating with a plurality of application apparatuses including a first application apparatus providing a first application and a second application apparatus providing a second application, and that issues and manages first identification information uniquely identifying each of a plurality of users who use the first application and second identification information uniquely identifying each of a plurality of users who use the second application. The management apparatus includes an issuing unit configured to issue an identifier associated with the first identification information of a user, with regard to the first application apparatus; a receiving unit configured to receive the identifier passed from the first application to the second application in a terminal apparatus where the first application and the second application are available; and a management unit configured to manage, in association with each other, the first identification information and the second identification information for which the identifier issued by the issuing unit matches the identifier received by the receiving unit.

In a non-limiting embodiment of the management apparatus according to the present invention, the management server 3 as the management apparatus has the communication interface 36 for communicating with the application servers 4A, 4B, 4C, . . . , with the application server 4A being the first application apparatus providing game A as the first application and the application server 4B being the second application apparatus providing game B as the second application. The management server 3 issues and manages FNWIDa as the first identification information uniquely identifying each of a plurality of users who use game A and FNWIDb as the second identification information uniquely identifying each of a plurality of users who use game B. The management server 3 includes the issuing unit 11 configured to issue the token Tx as the identifier associated with FNWIDa of a user, with regard to the application server 4A; the receiving unit 12 configured to receive the token Tx passed from game A to game B in the terminal apparatus 2 where both of game A and game B can be played; and the management unit 13 configured to manage, in association with each other, FNWIDa and FNWIDb for which the token Tx issued by the issuing unit 11 matches the token Tx received by the receiving unit 12.

It is preferable that, in the above-described management apparatus, a specific relationship between a user and another user be formed in an application provided by each of the plurality of application apparatuses; and the management unit acquire, from each of the plurality of application apparatuses, relationship information indicating the specific relationship between users of each of the plurality of applications, and manage the relationship information.

In a non-limiting embodiment of the present invention, the management unit 13 of the management server 3 acquires a companion list, as the relationship information, indicating specific relationships between users in each of the plurality of games from each of the plurality of application servers 4 and manages the list, such as shown in the companion relationship table TBL13.

It is preferable that the above-described management apparatus further include an accepting unit configured to accept an acquisition request for relationship information associated with the second identification information, the acquisition request being accepted from either a terminal apparatus that uses the first application or the first application apparatus; and a reporting unit configured to report the relationship information associated with the second identification information, to the terminal apparatus or to the first application apparatus, whichever sent the acquisition request.

In a non-limiting embodiment of the present invention, the management server 3 also includes the accepting unit 14 for accepting, from the terminal apparatus 2 of a user who uses game A, a companion list request, as the acquisition request, for requesting a companion list, as the relationship information, indicating a companion relationship associated with FNWIDb, and the reporting unit 15 for reporting the companion list associated with FNWIDb to the terminal apparatus 2 that has sent the companion list request or to the application server 4A.

It is preferable that the above-described management apparatus further include an accumulator configured to accept an invitation request for an invitation to the first application for a user to be invited, selected by an inviting user from among the relationship information reported by the reporting unit, and to accumulate the accepted invitation request.

In a non-limiting embodiment of the present invention, the management server 3 further includes the invitation information management unit 16, as the accumulator. The invitation information management unit 16 accepts an invitation request in which a request for an invitation to game A for a user to be invited, selected by the inviting user from among the companion list associated with FNWIDb reported by the reporting unit 15, and accumulates and manages the accepted invitation request.

It is preferable that, in the above-described management apparatus, when an inquiry about an invitation request is sent from the terminal apparatus, if an invitation request in which the user of the terminal apparatus serves as a user to be invited is accumulated in the accumulator, the reporting unit report invitation information indicating that the inviting user makes an invitation to the first application, to the terminal apparatus.

In a non-limiting embodiment of the present invention, when an inquiry about an invitation request is sent from the terminal apparatus 2, if an invitation request in which the user of the terminal apparatus 2 is a user to be invited is accumulated in the invitation information management unit 16, the reporting unit 15 of the management server 3 reports to the terminal apparatus 2 invitation information indicating that the inviting user invites the user to be invited to game A.

It is preferable that, in the above-described management apparatus, when an invitation request for a user to be invited is made, the user to be invited being selected by an inviting user from among the relationship information reported by the reporting unit, the reporting unit report, to the second application apparatus for the user to be invited, invitation information indicating that the inviting user makes an invitation to the first application.

In a non-limiting embodiment of the present invention, when an invitation request for a user to be invited is made, the user to be invited being selected by the inviting user from among the companion list associated with FNWIDb reported by the reporting unit 15 of the management server 3, the reporting unit 15 sends invitation information indicating that the inviting user makes an invitation to game A, to the application server 4B corresponding to the user to be invited.

In another aspect, it can also be understood from the above description that the present invention provides a control method for a management apparatus that has a communication unit for communicating with a plurality of application apparatuses including a first application apparatus providing a first application and a second application apparatus providing a second application, and that issues and manages first identification information uniquely identifying each of a plurality of users who use the first application and second identification information uniquely identifying each of a plurality of users who use the second application. The control method includes issuing an identifier associated with the first identification information of a user, to the first application apparatus; receiving, from the second application apparatus, the identifier passed from the first application to the second application; and managing, in association with each other, the first identification information and the second identification information for which the issued identifier matches the received identifier.

In a non-limiting embodiment of the present invention, the control method is used for the management server 3, as the management apparatus, having the communication interface 36 for communicating with the application servers 4A, 4B, 4C, . . . , with the application server 4A being the first application apparatus providing game A as the first application and the application server 4B being the second application apparatus providing game B as the second application. The control method includes issuing the token Tx as the identifier associated with FNWIDa of a user, with regard to the application server 4A; receiving, from the application server 4B, the token Tx passed from game A to game B in the terminal apparatus 2; and managing, in association with each other, FNWIDa and FNWIDb for which the issued token Tx matches the received token Tx.

In still another aspect, it can be understood from the above description that the present invention provides a computer-readable recording medium having recorded thereon a program used in a computer of a management apparatus that has a communication unit for communicating with a plurality of application apparatuses including a first application apparatus providing a first application and a second application apparatus providing a second application, and that issues and manages first identification information uniquely identifying each of a plurality of users who use the first application and second identification information uniquely identifying each of a plurality of users who use the second application. The program makes the computer of the management apparatus execute an issuing process of issuing an identifier associated with the first identification information of a user, to the first application apparatus; a receiving process of receiving, from the second application apparatus, the identifier passed from the first application to the second application; and a management process of managing, in association with each other, the first identification information and the second identification information for which the identifier issued in the issuing process matches the identifier received in the receiving process.

The recording medium is, for example, a non-transitory recording medium, one good example of which is an optical recording medium (optical disc) such as a CD-ROM, and can include a freely selected form of publically known recording mediums such as a semi-conductor recording medium or a magnetic recording medium.

In a non-limiting embodiment, a computer-readable recording medium of the present invention has recorded thereon a program used in the CPU 30, as the computer, of the management server 3 that has the communication interface 36 for communicating with the application servers 4A, 4B, 4C, . . . , with the application server 4A providing game A and the application server 4B providing game B, and that issues and manages FNWIDa uniquely identifying each of a plurality of users who use game A and FNWIDb uniquely identifying each of a plurality of users who use game B. The program makes the CPU 30 of the management server 3 execute an issuing process of issuing the token Tx associated with FNWIDa of a user, to the application server 4A; a receiving process of receiving, from the application server 4B, the token Tx passed from game A to game B; and a management process of managing, in association with each other, the FNWIDa and FNWIDb for which the token Tx issued in the issuing process matches the token Tx received in the receiving process.

REFERENCE NUMERALS

1: Communication network
2: Terminal apparatus
3: Server
3B, 3C, 3D: Application servers TBL11: User information table
TBL12: ID management table
TBL13: Companion relationship table
TBL14: Invitation table
11: Issuing unit
12: Receiving unit
13: Management unit
14: Accepting unit
15: Reporting unit
16: Invitation information management unit (accumulator)
30: CPU
100: Application system
201: Inquiry unit
202: Invitation information receiving unit
203: Display unit
204: Display control unit
205: Storage unit
206: Selection unit
207: Acquiring unit
208: Identifier reporting unit

What is claimed is:

1. A management apparatus that communicates with a plurality of application apparatuses including a first application apparatus providing a first application and a second application apparatus providing a second application, and that issues and manages first identification information uniquely identifying each of a plurality of users who use the first application and second identification information uniquely identifying each of a plurality of users who use the second application, the management apparatus comprising:
a memory configured to store one or more instructions; and
a processor configured to execute the one or more instructions to:
issue a first identifier associated with the first identification information of a user, with regard to the first application apparatus;
receive a second identifier after the second identifier is passed from the first application to the second application in a terminal apparatus where the first application and the second application are available, and second identification information, among a plurality of pieces of the second identification information for the plurality of users, for a user of the terminal apparatus; and
manage, in association with each other, the first identification information associated with the first identifier and the second identification information in a case in which the first identifier matches the second identifier.

2. The management apparatus according to claim 1, wherein a specific relationship with another user is formed in an application provided by each of the plurality of application apparatuses; and
the processor is further configured to execute the one or more instructions to acquire, from each of the plurality of application apparatuses, relationship information indicating the specific relationship of a user of each of the plurality of applications, and manage the relationship information.

3. The management apparatus according to claim 2, wherein the processor is further configured to execute the one or more instructions to accept an acquisition request relationship information associated with the second identification information from one of the terminal apparatus that uses the first application and the first application apparatus; and
report the relationship information associated with the second identification information, to the terminal apparatus or to the first application apparatus, whichever sent the acquisition request.

4. The management apparatus according to claim 3, wherein the processor is further configured to execute the one or more instructions to:
accept an invitation request for an invitation to the first application for a user to be invited, selected by an inviting user from among the relationship information reported, and
accumulate the accepted invitation request.

5. The management apparatus according to claim 4, wherein the processor is further configured to execute the one or more instructions to, when the terminal apparatus sends an inquiry about an invitation request, if an invitation request in which the user of the terminal apparatus serves as a user to be invited is accumulated, report invitation information indicating that the inviting user makes an invitation to the first application, to the terminal apparatus.

6. The management apparatus according to claim 3, wherein the processor is further configured to execute the one or more instructions to, when an invitation request for a user to be invited is made, the user to be invited being selected by an inviting user from among the relationship information reported, report, to the second application apparatus for the user to be invited, invitation information indicating that the inviting user makes an invitation to the first application.

7. A control method for a management apparatus that communicates with a plurality of application apparatuses including a first application apparatus providing a first application and a second application apparatus providing a second application, and that issues and manages first identification information uniquely identifying each of a plurality of users who use the first application and second identification information uniquely identifying each of a plurality of users who use the second application, the control method comprising:
issuing a first identifier associated with the first identification information of a user, to the first application apparatus;
receiving, from the second application apparatus, a second identifier after the second identifier is passed from the first application to the second application, and second identification information, among a plurality of pieces of the second identification information for the plurality of users, for a user of the terminal apparatus; and
managing, in association with each other, the first identification information associated with the first identifier and the second identification information in a case in which the first identifier matches the second identifier.

8. A non-transitory computer-readable recording medium having recorded thereon a program used in a computer of a management apparatus that communicates with a plurality of application apparatuses including a first application apparatus providing a first application and a second application apparatus providing a second application, and that issues and manages first identification information uniquely identifying each of a plurality of users who use the first application and second identification information uniquely identifying each of a plurality of users who use the second application, the program making the computer of the management apparatus execute:

an issuing process of issuing a first identifier associated with the first identification information of a user, to the first application apparatus;
a receiving process of receiving, from the second application apparatus, a second identifier after the second identifier is passed from the first application to the second application, and second identification information, among a plurality of pieces of the second identification information for the plurality of users, for a user of the terminal apparatus; and
a management process of managing, in association with each other, the first identification information associated with the first identifier and the second identification information in a case in which the first identifier issued in the issuing process matches the second identifier received in the receiving process.

* * * * *